United States Patent [19]

Mendoza

[11] Patent Number: 5,040,670
[45] Date of Patent: Aug. 20, 1991

[54] CONVEYOR FOR TORTILLA MAKING MACHINE

[76] Inventor: Fausto C. Mendoza, Calzada San Esteban, Num 57, Naucalpan de Juarez, Mexico

[21] Appl. No.: 622,398

[22] Filed: Nov. 30, 1990

Related U.S. Application Data

[63] Continuation of Ser. No. 298,016, Jan. 18, 1989, abandoned.

[51] Int. Cl.⁵ .............................................. B65G 23/06
[52] U.S. Cl. .................................... 198/834; 198/851; 198/853
[58] Field of Search ........................ 198/851, 853, 834

[56] References Cited

U.S. PATENT DOCUMENTS

| | | | |
|---|---|---|---|
| 1,966,659 | 7/1934 | Wynne et al. | 198/853 |
| 2,446,936 | 8/1948 | Leithmann, Jr. et al. | 198/853 X |
| 2,569,636 | 10/1951 | Imse | 198/853 |
| 2,660,292 | 11/1953 | Chessman | 198/853 |
| 3,036,695 | 5/1962 | Thuerman | 198/853 |
| 3,144,124 | 8/1964 | Hein | 198/853 |
| 3,363,745 | 1/1968 | Thuerman et la. | 198/853 |
| 3,672,488 | 6/1972 | Collins | 198/853 X |
| 4,138,011 | 2/1979 | Lapeyre | 198/853 X |

FOREIGN PATENT DOCUMENTS

| | | | |
|---|---|---|---|
| 723469 | 12/1965 | Canada | 198/851 |
| 21895 | 8/1956 | Fed. Rep. of Germany | 198/853 |

Primary Examiner—D. Glenn Dayoan
Attorney, Agent, or Firm—Jeffers, Hoffman & Niewyk

[57] ABSTRACT

A tortilla making machine conveyor includes an endless belt adapted to be moved about an endless path by a rotatable drive roller. The belt is composed of elongated narrow boards and pivotal hinges. The boards are planar in cross-section, disposed in side-by-side relation to one another and extend in transverse relation to the path along which the belt is capable of being moved. The pivotal hinges extend in bridging relation across, and are attached to respective adjacent pairs of, the boards on interior sides thereof. Each hinge along adjacent edge portions of the pairs of boards has pivotally connected portions which project inwardly from the interior surface of the belt. The drive roller receives the endless belt in an entrained relation about it and has a series of drive teeth or cogs defined in spaced relation about its exterior periphery. Each of the drive cogs is adapted to successively receive in driving relation the inwardly-projecting pivotally-connected portions of one of the hinges as the drive roller is rotated to drivingly move the belt about its endless path.

1 Claim, 2 Drawing Sheets

CONVEYOR FOR TORTILLA MAKING MACHINE

This is a continuation of application Ser. No. 298,016, filed Jan. 18, 1989, now abandoned.

BACKGROUND OF THE INVENTION

1. Field of the Invention

The present invention generally relates to tortilla preparation and, more particularly, is concerned with an improved conveyor for a tortilla making machine.

2. Description of the Prior Art

Heretofore, tortilla making machines have used conveyors having metal belts with articulated boards to cook tortillas. The articulation of the boards is accomplished by joining the boards together with two rings at their opposite ends, such as illustrated in FIG. 2A. To move these belts, the conveyor has used rollers to generate frictional traction. A conveyor using frictional traction requires the belts to operate under a high degree of tension so that friction between the belts and the rollers of the conveyor will generate the belt's motion.

In addition to operating under tension, the prior art belt with boards articulated by rings operates while subjected to a temperature of between 300 and 350 degrees C (570 to 660 degrees F) which is the average temperature in tortilla making machines. In such environment, the prior art belt suffers wearing out in the clefts that serve to link the rings. The effect of cleft wear is that, instead of a normal gap or separation of 0.39 mm (0.015 inch) between adjacent boards, separation increases to as much as 3.17 mm (0.125 inch) or more. The result is that cooking of tortillas is hindered, even to the point of causing imperfections therein and, therefore, lowering of its quality.

Furthermore, the boards of the prior art belt are curved in cross section. This results in a disadvantage in the way the tortillas cook. Certain strip-like portions of the tortillas have more contact with the surface or upper part of the boards than other portions of the tortillas. The separation left between the boards causes the tortilla to make only incomplete contact with the belt. The result is that the part of the tortilla that lies across the gap or separation between the adjacent boards and makes faulty contact turns out to have imperfectly cooked strips.

Consequently, a need exists for improvements to be made in the construction of the conveyor belts which will effectively overcome the above described problems without introducing a set of new ones.

SUMMARY OF THE INVENTION

The present invention provides a tortilla making machine conveyor designed to satisfy the aforementioned needs. The conveyor of the present invention uses hinges in place of rings to articulate the boards to one another and thereby provide a better structured belt. Belts with hinge articulation need not be tensioned to drive the same. The conveyor of the present invention also uses rollers having a series of drive cogs defined about the peripheries thereof, instead of having a smooth surface. The drive cogs make positive engagement with the hinges to pull, drag or move the belt without the need to tension it in order to apply frictional traction thereto. The hinged articulation thus eliminates wear and prevents undesired separation. Also, the hinges allow the use of boards with flat, as opposed to, curved configurations. Although the conveyor belt constructed in accordance with the present invention may involve a higher production cost due to the need for a larger amount of material, the advantages obtained through longer life, less wear, and better quality of the tortillas, more than offset the higher cost.

Accordingly, the present invention is directed to a tortilla making machine conveyor which includes an endless belt adapted to be moved about an endless path and being composed of a plurality of elongated narrow boards and a plurality of pivotal hinges.

The boards of the belt generally planar in cross-section are disposed in side-by-side relation to one another and extend in transverse relation to the direction in which the belt is capable of being moved about its endless path. Also, the boards of the belt have respective exterior sides defining an exterior surface on the belt along an upper extent of which the belt is adapted to support tortillas. Further, the boards of the belt have respective interior sides defining an interior surface on the belt.

The pivotal hinges of the belt extend in bridging relation across, and are attached to respective adjacent pairs of, the boards on the interior sides thereof. Each of the hinges along adjacent edge portions of the pairs of boards have pivotally connected portions which project inwardly from the interior surface of the belt.

Further, the conveyor includes at least one rotatable drive structure adapted to receive the endless belt in an entrained relation thereabout. The drive structure being preferably in the form of a roller has a series of drive teeth or cogs defined in spaced relation about its exterior periphery. Each of the drive cogs is adapted to successively receive in driving relation the inwardly-projecting pivotally-connected portions of one of the hinges as the drive structure is rotated to drivingly move the belt about its endless path.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
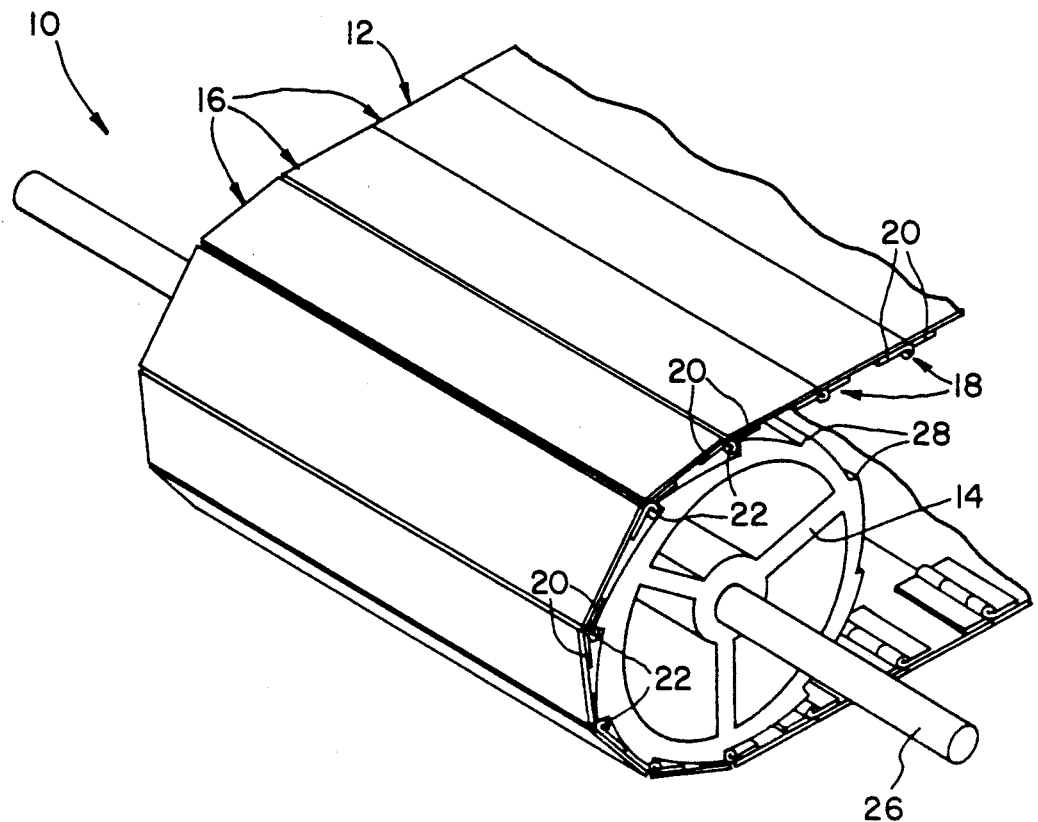
FIG. 1 is a fragmentary perspective view of a tortilla making machine conveyor constructed in accordance with the principles of the present invention.
Figure 2:
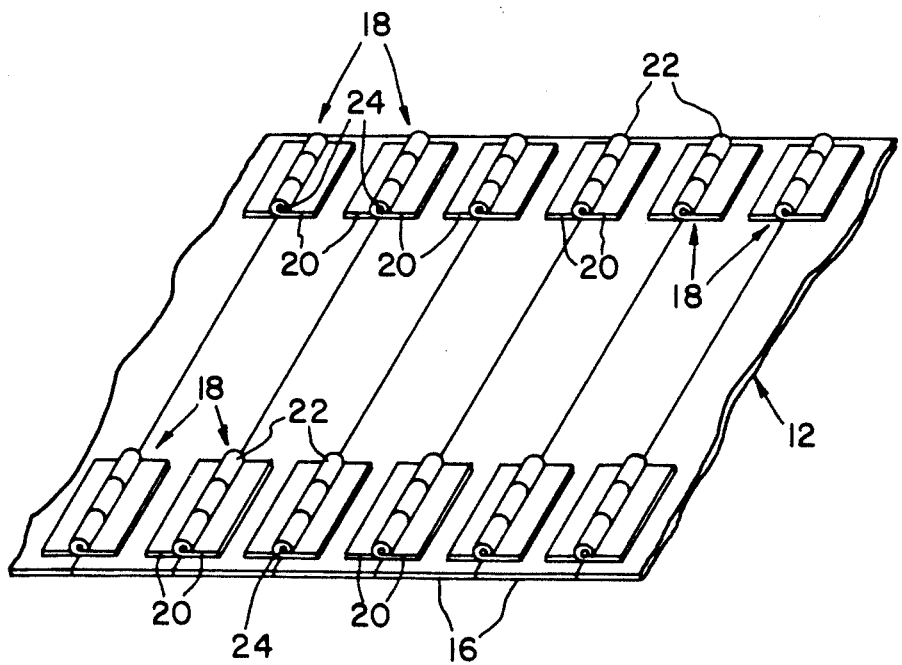
FIG. 2 is a fragmentary perspective view of a belt of the conveyor of FIG. 1.
Figure 3:
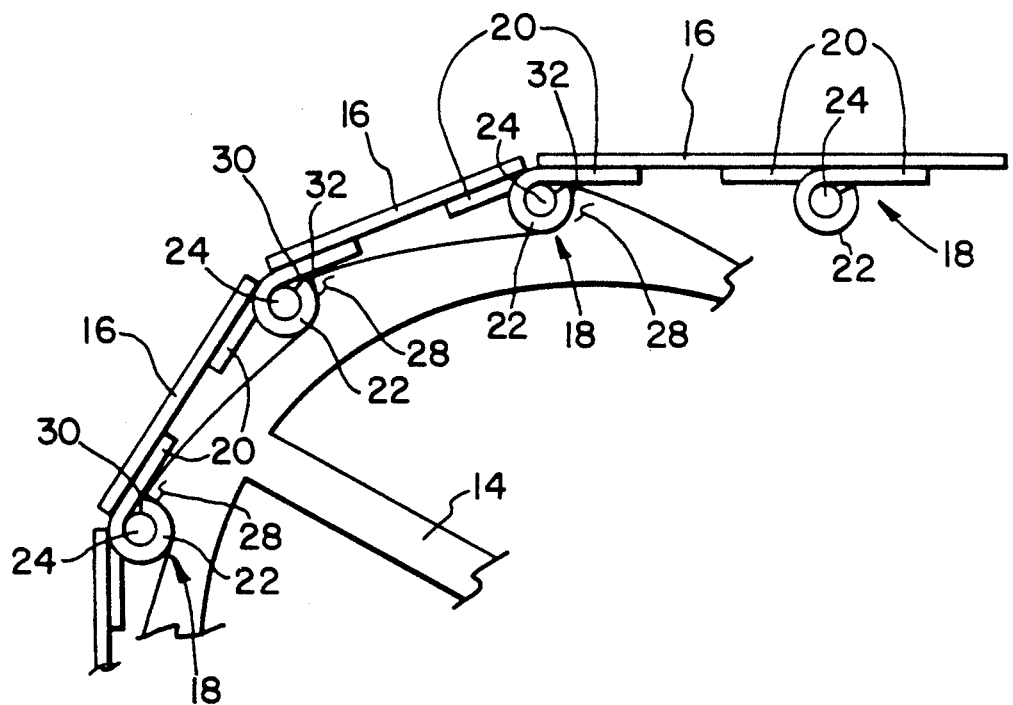
FIG. 3 is a fragmentary side elevational view of the conveyor of FIG. 1.

Referring now to the drawings, and particularly to FIGS. 1 to 3, there is shown a tortilla making machine conveyor, generally designated by the numeral 10 and constituting the preferred embodiment of the present invention. In its basic components, the conveyor 10 includes an endless belt 12 adapted to be moved about an endless path, and rollers 14 adapted to receive the belt 12 in an entrained relation thereabout and at least one of which is adapted for driving or pulling the belt 12 along the endless path. The belt 12 is composed of a plurality of elongated narrow boards 16 disposed in side-by-side relation to one another, and a plurality of pivotal hinges 18 pivotally connecting adjacent ones of the boards 16 together.

More particularly, the boards 16 of the conveyor belt 12 are generally straight or planar in both longitudinal and cross-section extents. Further, the boards 16 extend in transverse relation to the direction in which the belt 12 is capable of being moved about its endless path. Also, the boards 16 of the belt 12 have respective exterior sides defining an exterior surface on the belt 12 along an upper extend of which the belt 12 is adapted to support tortillas. The boards 16 also have respective interior sides defining an interior surface on the belt 12.

The pivotal hinges 18 of the conveyor belt 12 are arranged in pairs thereof along the belt 12. Each pair of pivotal hinges 18 extends in bridging relation across, and is attached to respective adjacent pairs of, the boards 16 adjacent opposite longitudinal ends thereof and on the interior sides thereof. More particularly, each of the pivotal hinges 18 includes a pair of planar plates or parts 20 attached respectively to the adjacent boards 16 along adjacent edge portions thereof. Further, each of the planar parts 20 of the hinge 18 along adjacent edges 22 thereof are curled so as to project inwardly from the interior surface of the belt 12. The rounded edges 22 of each pair of planar parts 20 of each hinge 18 are disposed in side-by-side relation and pivotally connected together by a pin 24 extending through the aligned centers of the curled edges 22. This adapts the hinge planar parts 20 to pivot toward and away from one another about an axis defined by the pin 24 as the belt 12 moves around the rollers 14.

Each rotatable drive roller 14 which receives the endless belt 12 in an entrained relation thereabout is supported on a shaft 26 and has a series of drive teeth or cogs 28 defined in spaced relation about its exterior periphery. Each of the drive cogs 28 has a J-shaped configuration wherein the tips 30, 32 of the straight end and opposite loop end of the J-shaped cog 28 both lie on a circle encompassing the roller 14. Each of the cogs 28 so shaped is thus adapted to successively receive in a driving relation the pivotally connected curled edges 22 of the parts 20 of one of the hinges 18 as the driving one of the rollers 14 is rotated to drivenly pull the belt 12 about its endless path. Such technique of driving the belt 12 eliminates the need to apply tension to the belt 12 in order to move.

Figure 2A:
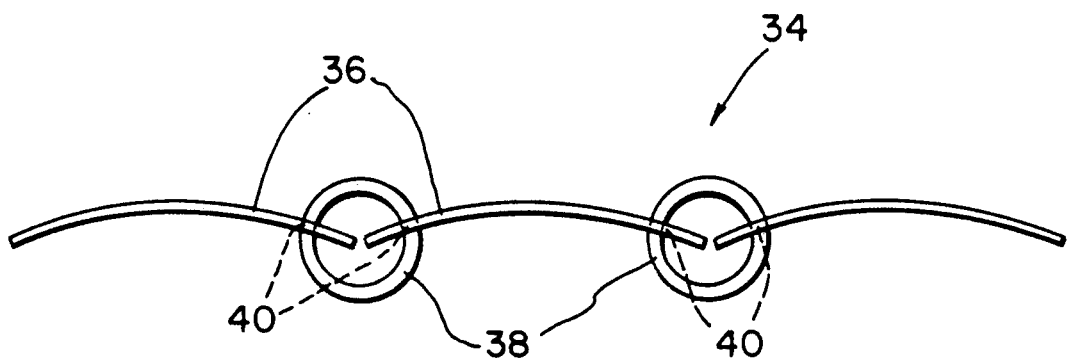
FIG. 2A is a fragmentary side elevational view of a prior art belt.

In contrast to the above-described construction of the belt 12 of the present invention, the prior art belt 34 seen in FIG. 2A has a series of boards 36 joined through rings 38 passing through holes 40 in the opposite ends of adjacent pairs of the boards 36. Also, the boards 36 are curved in cross-section so that an empty region or gap is left along and above adjacent edge portions of adjoining boards and between the central portions of the boards 36 where the tortillas are supported on the belt 34.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being meerly preferred or exemplary embodiments thereof.

What is claimed is:

1. A tortilla making machine conveyor, comprising:
   (a) an endless belt adapted to be moved about an endless path and composed of a plurality of rigid elongated narrow boards and a plurality of pivotal hinges;
   (b) said boards being generally planar in cross-section, extending in transverse relation to the direction in which said belt is capable of being moved about its endless path, and being disposed in side-by-side relation to one another, said boards having respective exterior sides defining an exterior surface on said belt along an upper extend of which said belt is adapted to support tortillas and having respective interior sides defining an interior surface on said belt;
   (c) a pair of said pivotal hinges extending in bridging relation across, and being attached to respective adjacent pairs of, said boards adjacent opposite ends thereof and on said interior sides thereof, each of said hinges including a pair of planar members attached respectively to said adjacent boards along adjacent edge portions thereof, one of each of said pair of planar members along adjacent edges thereof being curled so as to project inwardly from said interior surface of said belt in the direction opposite to the direction of movement of said belt, said planar members being pivotally connected together at said curled edges and adapted to pivot relative to one another about an axis defined by said pivotally connected curled edges, each of said pair of curled edges of each of said hinges projecting in the same direction; and
   (d) at least one rotatable drive roller adapted to receive said endless belt in an entrained relation thereabout, said drive roller having a series of substantially triangular notches having curved portions for defining drive teeth in spaced relation about its exterior periphery, each of said drive teeth having a substantially J-shaped configuration including a straight end and an opposite loop end wherein said straight ends and said opposite loop ends of said drive teeth define a circle which encompasses said drive roller, said drive teeth for successively drivingly receiving said curled edges of said planar members of one of said hinges as said drive roller is rotated to drivingly pull said belt about its endless path without the need to apply tension to said belt in order to moves said belt.

* * * * *